United States Patent [19]
Mahalingaiah et al.

[11] Patent Number: 6,141,740
[45] Date of Patent: *Oct. 31, 2000

[54] APPARATUS AND METHOD FOR MICROCODE PATCHING FOR GENERATING A NEXT ADDRESS

[75] Inventors: Rupaka Mahalingaiah; Paul K. Miller, both of Austin, Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/808,483

[22] Filed: Mar. 3, 1997

[51] Int. Cl.$^7$ .............................. G06F 12/10; G06F 12/06

[52] U.S. Cl. .................. 711/215; 711/214; 711/202; 711/219; 711/125; 711/144; 711/145

[58] Field of Search .................................. 711/102, 103, 711/115, 127, 157, 116, 215, 214, 202, 219, 125, 144, 145; 365/230.01

[56] References Cited

U.S. PATENT DOCUMENTS

| | | | |
|---|---|---|---|
| 4,028,678 | 6/1977 | Moran | 340/172.5 |
| 4,028,679 | 6/1977 | Divine . | |
| 4,028,683 | 6/1977 | Divine et al. . | |
| 4,028,684 | 6/1977 | Divine et al. | 340/172.5 |
| 4,044,338 | 8/1977 | Wolf . | |
| 4,400,798 | 8/1983 | Francis et al. . | |
| 4,453,212 | 6/1984 | Gaither et al. . | |
| 4,482,953 | 11/1984 | Burke . | |
| 4,503,492 | 3/1985 | Pilat | 711/202 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

IBM Technical Disclosure Bulletin entitled, "On–Site ROS Patch Mechanism," vol. 30, No. 5, Oct. 1987, New York, U.S.A., pp. 158–160.

Scherpenberg, F.A. et al., Electronics De 1984 A 1985: Electronics Week, "Asynchronous Circuits Accelerate Access to 256–K Read–Only Memory," pp. 141–145.

International Search Report for PCT/US 96/08131.

*Primary Examiner*—B. James Peikari
*Attorney, Agent, or Firm*—Conley, Rose & Tayon, PC; Lawrence J. Merkel

[57] ABSTRACT

A superscalar microprocessor implements a microcode instruction unit that patches existing microcode instructions with substitute microcode instructions. A flag bit is associated with each line of microcode in the microcode instruction unit. If the flag bit is asserted, the microcode instruction unit branches to a patch microcode routine that causes a substitute microcode instruction stored in external RAM to be loaded into patch data registers. The transfer of the substitute microcode instruction to the patch data registers is accomplished using data transfer procedures. The microcode instruction unit then dispatches the substitute instructions stored in the patch data registers and the substitute instruction is executed by a functional unit in place of the existing microcode instruction.

22 Claims, 7 Drawing Sheets

U.S. PATENT DOCUMENTS

| | | | |
|---|---|---|---|
| 4,542,453 | 9/1985 | Patrick et al. | 714/8 |
| 4,577,319 | 3/1986 | Takeuchi et al. | 714/765 |
| 4,610,000 | 9/1986 | Lee . | |
| 4,751,703 | 6/1988 | Picon et al. | 714/8 |
| 4,802,119 | 1/1989 | Heene et al. . | |
| 4,807,115 | 2/1989 | Torng . | |
| 4,858,105 | 8/1989 | Kuriyama et al. . | |
| 4,928,223 | 5/1990 | Dao et al. . | |
| 4,982,360 | 1/1991 | Johnson et al. . | |
| 5,053,631 | 10/1991 | Perlman et al. . | |
| 5,053,949 | 10/1991 | Allison et al. . | |
| 5,058,048 | 10/1991 | Gupta et al. . | |
| 5,129,067 | 7/1992 | Johnson . | |
| 5,136,697 | 8/1992 | Johnson . | |
| 5,226,126 | 7/1993 | McFarland et al. . | |
| 5,226,130 | 7/1993 | Favor et al. . | |
| 5,295,247 | 3/1994 | Chang et al. . | |
| 5,321,830 | 6/1994 | Nakamura et al. . | |
| 5,333,292 | 7/1994 | Takemoto et al. | 711/103 |
| 5,355,463 | 10/1994 | Moeller | 711/203 |
| 5,367,571 | 11/1994 | Bowen et al. . | |
| 5,379,301 | 1/1995 | Sato et al. . | |
| 5,425,036 | 6/1995 | Liu et al. . | |
| 5,440,632 | 8/1995 | Bacon et al. . | |
| 5,454,100 | 9/1995 | Sagane . | |
| 5,481,713 | 1/1996 | Wetmore et al. . | |
| 5,694,348 | 12/1997 | Guttag et al. | 708/525 |
| 5,694,587 | 12/1997 | Webb et al. | 712/224 |
| 5,713,035 | 1/1998 | Farrell et al. | 712/41 |
| 5,790,843 | 8/1998 | Borkenhagen et al. . | |
| 5,790,860 | 8/1998 | Wetmore et al. . | |
| 5,794,063 | 8/1998 | Favor . | |
| 5,796,972 | 8/1998 | Johnson et al. . | |
| 5,796,974 | 8/1998 | Goddard et al. | 712/211 |
| 5,799,144 | 8/1998 | Mio . | |
| 5,829,012 | 10/1998 | Marlan et al. . | | ate
APPARATUS AND METHOD FOR MICROCODE PATCHING FOR GENERATING A NEXT ADDRESS

CROSS REFERENCE TO RELATED APPLICATIONS

This application is related to the following patent applications:

"A Byte Queue Divided into Multiple Subqueues for Optimizing Instruction Selection Logic", U.S. patent application Ser. No. 08/650,940, now U.S. Pat. No. 5,748,978.

"A Method For Concurrently Dispatching Microcode And Directly-Decoded Instructions In A Microprocessor", filed on Jul. 24, 1996 by Narayan et al., Ser. No. 08/685,656, now abandoned in favor of FWC application Ser. No. 08/878,228.

BACKGROUND OF THE INVENTION

1. Field of the Invention

This invention relates to the field of microprocessors and, more particularly, to microcode instruction patching mechanisms within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-capable computer systems. Such computer systems are often well received within the industry due to the wide range of available computer programs.

The x86 microprocessor architecture specifies a variable length instruction set (i.e. an instruction set in which various instructions employ differing numbers of bytes to specify that instruction). For example, the 80386 and later versions of x86 microprocessors employ between 1 and 15 bytes to specify a particular instruction. Instructions have an opcode, which may be 1–2 bytes, and additional bytes may be added to specify addressing modes, operands, and additional details regarding the instruction to be executed. Certain instructions within the x86 instruction set are quite complex, specifying multiple operations to be performed. For example, the PUSHA instruction specifies that each of the x86 registers be pushed onto a stack defined by the value in the ESP register. The corresponding operations are a store operation for each register, and decrements of the ESP register between each store operation to generate the address for the next store operation.

Often, complex instructions are classified as MROM instructions. MROM instructions are transmitted to a microcode unit within the microprocessor, which decodes the complex MROM instruction and produces two or more simpler microcode instructions for execution by the microprocessor. The simpler microcode instructions corresponding to the MROM instruction are typically stored in a read-only memory (ROM) within the microcode unit. The microcode unit determines an address within the ROM at which the microcode instructions are stored, and transfers the microcode instructions out of the ROM beginning at that address. Multiple clock cycles may be used to transfer the entire set of instructions within the ROM that correspond to the MROM instruction. Different instructions may require differing numbers of microcode instructions to effectuate their corresponding functions. Additionally, the number of microcode instructions corresponding to a particular MROM instruction may vary according to the addressing mode of the instruction, the operand values, and/or the options included with the instruction. The microcode unit issues the microcode instructions into the instruction processing pipeline of the microprocessor. The microcode instructions are thereafter executed in a similar fashion to other instructions. It is noted that the microcode instructions may be instructions defined within the instruction set, or may be custom instructions defined for the particular microprocessor.

Conversely, less complex instructions are decoded by hardware decode units within the microprocessor, without intervention by the microcode unit. The terms "directly-decoded instruction" and "fastpath instruction" will be used herein to refer to instructions which are decoded and executed by the microprocessor without the aid of a microcode unit. As opposed to MROM instructions which are reduced to simpler instructions which may be handled by the microprocessor, directly-decoded instructions are decoded and executed via hardware decode and functional units included within the microprocessor.

New microprocessor designs typically are produced in iterative steps. Microprocessor prototypes are fabricated on silicon chips, and then are tested using various techniques to determine if the processor design, as fabricated, will perform satisfactorily. As errors are detected, the microprocessor design is modified and new prototypes are produced embodying the modified design. This seemingly continuous process of designing, fabricating and testing a processor design is referred to as "debugging."

One of the portions of the microprocessor design that requires debugging is the microcode. As the microprocessor is tested, errors may be discovered in the microcode instructions. Because of the limited access to the microcode, the microcode is typically changed only when new prototypes are produced for successive designs. Furthermore, when errors are found in the microcode, all related debugging is typically stopped, because it is inefficient to modify the processor hardware when the associated microcode will be revised. Consequently, further debugging in related areas is halted until the new prototypes are produced.

When errors (or bugs) are found in microcode instructions, these errors are documented to system designers. Typically, the system designers run simulations to find ways to change the microcode to correct the errors detected. These changes cannot be effectively tested until the next prototype is produced, with the changes to the microcode embedded in the internal ROM of the subsequent processor prototype. A problem with this approach is that the changes to the microcode cannot be verified in the system environment before the changes are committed to silicon. This procedure can greatly increase the cost and time expended during the design process, as unverified changes are made to the microcode and incorporated in a subsequent prototype of the microprocessor, only to fail.

One way to overcome the above problem is to incorporate a technique for patching existing microcode instructions with substitute microcode instructions. When a microcode instruction that needs to be patched is encountered, the instruction fetching mechanism of the microprocessor accesses the substitute microcode instruction from external memory and loads the substitute instruction into the instruction cache. As used herein, the term "external memory" refers to any storage device external to the microcode unit. The substitute instruction, or patched instruction, is then routed from the instruction cache to the microcode unit. The microcode unit uses the substitute microcode instruction as a substitute for the existing microcode instruction.

Unfortunately, fetching patched microcode instructions from external memory causes a significant portion of the microprocessor to be redesigned. The instruction fetching and alignment mechanisms are designed for x86 type instructions, not microcode instructions. Microcode instructions are typically a different length thean x86 instructions and are encoded differently. Therefore, the instruction fetching mechanism, instruction cache and other circuitry are not designed to handle microcode instructions. To implement the above described patching mechanism, this circuitry must be redesigned to accommodate patched microcode instructions.

SUMMARY OF THE INVENTION

The problems outlined above are in large part solved by a microcode instruction unit in accordance with the present invention. When the microcode instruction unit detects an existing microcode instruction that should be patched, the microcode unit branches to a patch microcode routine. The patch microcode routine dispatches microcode instructions that fetch a substitute microcode instruction from external memory and stored it into one or more patch registers within the microcode instruction unit. The substitute microcode instruction stored in the patch register is then dispatched into the instruction processing data stream by the microcode unit. The present invention, advantageously fetches the substitute microcode instruction using data accesses rather than instruction accesses. In other words, the substitute microcode instruction is fetched from external memory in the same way as data is fetched. By fetching the substitute instruction using data accesses, the patch mechanism is local to the microcode engine. In the present invention, only the microcode unit needs to be modified to handle substitute instructions, the other blocks of the microprocessor are advantageously not affected by the patching mechanism.

Broadly speaking, the present invention contemplates a microcode patching device including a first memory, a second memory, an address generator, and a controller. The first memory stores microcode instructions including a patch microcode routine. The second memory stores a plurality of flag bits. Each of the microcode instructions is associated with one of the flag bits. The address generator is coupled to the first memory, and generates an entry point address of a first microcode instruction within the first memory. The controller is coupled to the first memory and the second memory. If a flag bit associated with the first microcode instruction is asserted, the controller branches to the patch microcode routine. The controller also dispatches a second microcode instruction that stores a substitute microcode instruction in a data register, and dispatches the substitute microcode instruction.

The present invention further contemplates a method of patching microcode instructions comprising the steps of: receiving an entry point address; accessing a microcode instruction using the entry point address; and accessing a flag bit associated with the microcode instruction. If the flag bit is deasserted, the microcode instruction is dispatched. If the flag bit is asserted, a patch microcode routine is invoked. The patch microcode routine dispatches microcode instructions that store a substitute microcode instruction in a data register. The substitute microcode instruction is then dispatched into an instruction processing pipeline.

The present invention still further contemplates a microprocessor including an instruction cache, a first instruction unit coupled to the instruction cache, a microcode instruction unit coupled to the instruction cache, a decode unit coupled to the first instruction unit and the microcode instruction unit, and one or more functional units coupled to the decode unit. The microcode instruction unit includes a first memory, a second memory, an address generator, and a controller. The first memory stores microcode instructions including a patch microcode routine. The second memory stores a plurality of flag bits. Each of the microcode instructions is associated with one of the flag bits. The address generator is coupled to the first memory, and generates an entry point address of a first microcode instruction within the first memory. The controller is coupled to the first memory and the second memory. If a flag bit associated with the first microcode word is asserted, the controller branches to the patch microcode routine. The controller also dispatches a second microcode instruction that stores a substitute microcode instruction in a data register, and dispatches the substitute microcode instruction.

BRIEF DESCRIPTION OF THE DRAWINGS

Other objects and advantages of the invention will become apparent upon reading the following detailed description and upon reference to the accompanying drawings in which.

Figure 1:
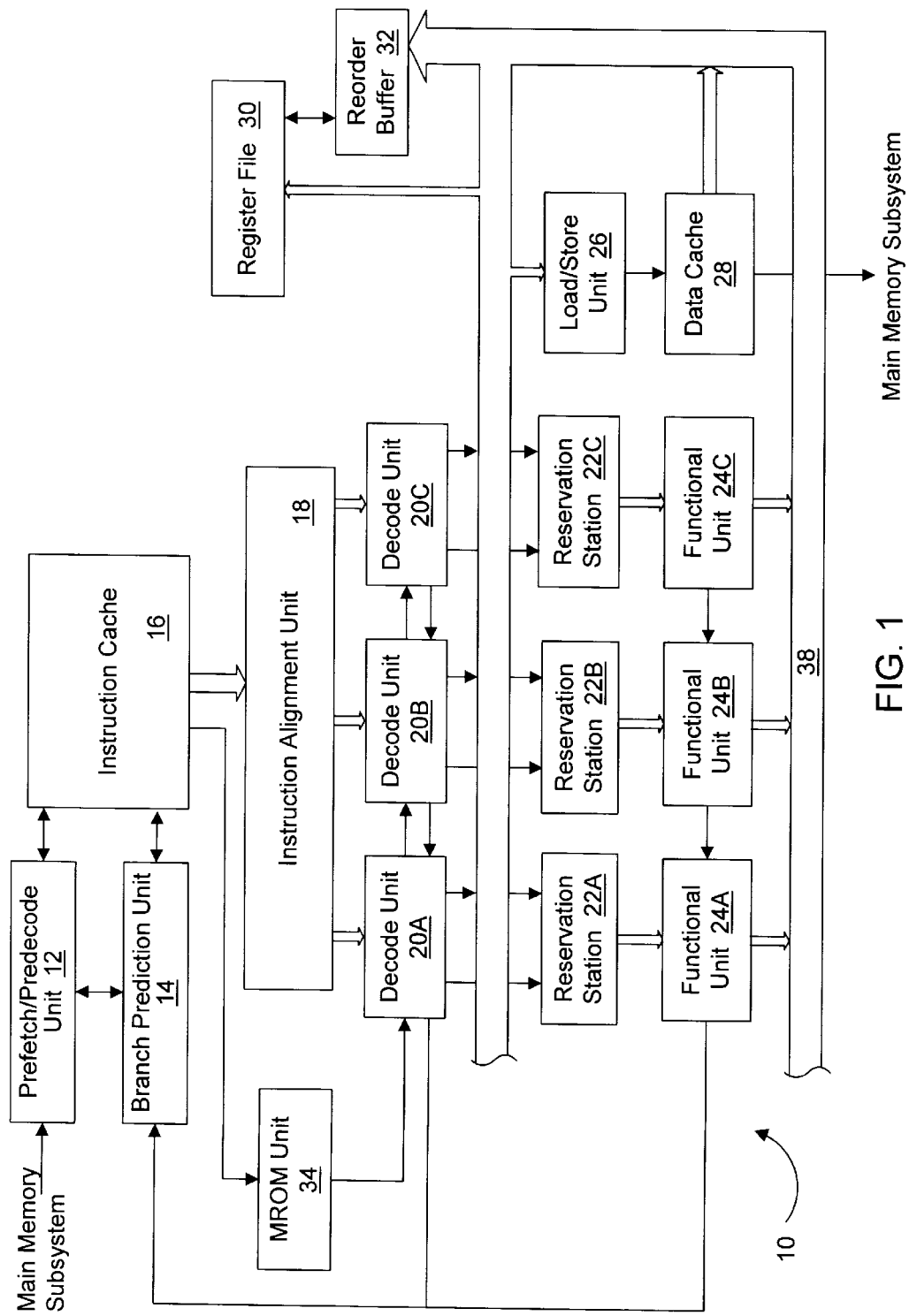
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. MROM unit 34 is one embodiment of a microcode unit. Blocks referred to herein with a reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, MROM unit 34 decodes an MROM instruction and dispatches a plurality of microcode instructions that effectuates the operation of the MROM instruction into the instruction processing pipeline. To aid in debugging, MROM unit 34 provides a mechanism to replace existing microcode instructions with substitute microcode instructions stored in external memory. A flag bit is appended to the microcode instructions of MROM unit 34. If the flag bit is asserted, MROM unit 34 invokes a patching mechanism to replace the existing microcode instruction with a substitute microcode instruction. The patching mechanism invokes a patch microcode routine that dispatches a plurality of microcode instructions that cause the substitute microcode instruction to be read from external memory and stored in one or more registers within MROM unit 34. The substitute instruction is moved from external memory to the patch registers using existing data access instructions. After the substitute microcode instruction is stored in the patch registers, MROM unit 34 dispatches the substitute instruction into the instruction processing pipeline.

Microprocessor 10 is configured to align instructions from instruction cache 16 to decode units 20 using instruction alignment unit 18. Instructions are fetched as an aligned plurality of bytes from a cache line within instruction cache 16. Instructions of interest may be stored beginning at any arbitrary byte within the fetched bytes. For example, a branch instruction may be executed having a target address which lies within a cache line. The instructions of interest therefore begin at the byte identified by the target address of the branch instruction. From the instruction bytes fetched, instruction alignment unit 18 identifies the instructions to be executed. Instruction alignment unit 18 conveys the instructions, in predicted program order, to decode units 20 for decode and execution.

Instruction alignment unit 18 includes a byte queue configured to store instruction bytes. An instruction scanning unit within instruction cache 16 separates the instructions fetched into instruction blocks. Each instruction block comprises a predefined number of instruction bytes. The instruction scanning unit identifies up to a predefined maximum number of instructions within the instruction block. Instruction identification information for each of the identified instructions is conveyed to instruction alignment unit 18 and is stored in the byte queue. The instruction identification information includes an indication of the validity of the instruction, as well as indications of the start and end of the instruction within the predefined number of instruction bytes. In one embodiment, the predefined number of instruction bytes comprises eight instruction bytes stored in contiguous main memory storage locations. The eight instruction bytes are aligned to an eight byte boundary (i.e. the least significant three bits of the address of the first of the contiguous bytes are zero). If more than the maximum number of instructions are contained within a particular predefined number of instruction bytes, the instruction bytes are scanned again during a subsequent clock cycle. The same instruction bytes are conveyed as another instruction block, with the additional instructions within the instruction bytes identified by the accompanying instruction identification information. Therefore, an instruction block may be defined as up to a predefined maximum number of instructions contained within a predefined number of instruction bytes.

The byte queue stores each instruction block and corresponding instruction identification information within a subqueue defined therein. The subqueues include a position for each possible valid instruction within the instruction block. The positions store instruction identification information and are maintained such that the instruction identification information for the first valid instruction within the subqueue is stored in a first position within the subqueue, instruction identification information regarding the second valid instruction (in program order) is stored in a second position within the subqueue, etc. When instructions within the subqueue are dispatched, instruction identification information corresponding to subsequent instructions are shifted within the positions of the subqueue such that the first of the remaining instructions is stored in the first position. Advantageously, instruction alignment unit 18 may only consider the instruction information stored in the first position of each subqueue to detect the instruction to be dispatched to decode unit 20A. Similarly, only the second position of the first subqueue (the subqueue storing instructions prior to the instructions stored in the other subqueues in program order) may be considered for dispatch of instructions to decode unit 20B. By managing the subqueues in this manner, logic for selecting and aligning instructions may be simplified. Fewer cascaded levels of logic may be employed for performing the selection and alignment process, allowing for high frequency implementation of microprocessor 10.

Because instructions are variable length, an instruction may begin within a particular instruction block but end in another instruction block. Instructions beginning within a particular instruction block and ending in another instruction block are referred to as "overflow instructions". The subqueue storing the instruction block within which an overflow instruction begins uses the last position to store the overflow instruction's identification information. Unlike the other positions, the instruction identification information of the last position is not shifted from the last position when an overflow instruction is stored therein. Advantageously, instruction alignment unit 18 need only search the last position of a particular subqueue to identify an instruction overflowing from one subqueue to another.

As used herein, the term queue refers to a storage device for storing a plurality of data items. The data items are stored with an ordered relationship between them. For example, the data items of the byte queue are instructions. The ordered relationship between the instructions is the program order of the instructions. Data items are removed from the queue according to the ordered relationship in a first in-first out (FIFO) fashion. Additionally, the term shifting is used to refer to movement of data items within the queue. When a data item is shifted from a first storage location to a second storage location, the data item is copied from the first storage location to the second storage location and invalidated in the second storage location. The invalidation may occur by shifting yet another data item into the second storage location, or by resetting a valid indication in the second storage location.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. For this embodiment of microprocessor 10, instructions which may be directly decoded by decode units 20 are referred to as "fast path" instructions. Fast path instructions may be an example of directly-decoded instructions for this embodiment. The remaining x86 instructions are referred to as MROM instructions, according to one embodiment. For this embodiment, MROM instructions are an example of microcode instructions.

For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| Start bits | 10000 |
|---|---|
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined microcode instructions to effectuate the desired operation. MROM unit 34 dispatches the subset of microcode instructions to decode units 20. Microcode instructions, like fast path instructions are directly decodable. A listing of exemplary x86 instructions categorized as fast path instructions or MROM instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order. As used herein, the term "program order" refers to the order of the instruction as coded in the original sequence in memory. The program order of instructions is the order in which the instructions would be executed upon a microprocessor which fetches, decodes, executes, and writes the result of a particular instruction prior to fetching another instruction. Additionally, the term "dispatch" is used to refer to conveyance of an instruction to an issue position which is to execute the instruction. Issue positions may also dispatch load/store memory operations to load/store unit 26.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C. As used herein, the term "issue position" refers to logic circuitry configured to receive an instruction and to execute that instruction. Once the instruction enters the issue position, it remains in that issue position until the execution of the instruction is completed.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated similar to load/store unit 26 in that any of decode units 20 may dispatch instructions to the floating point unit. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
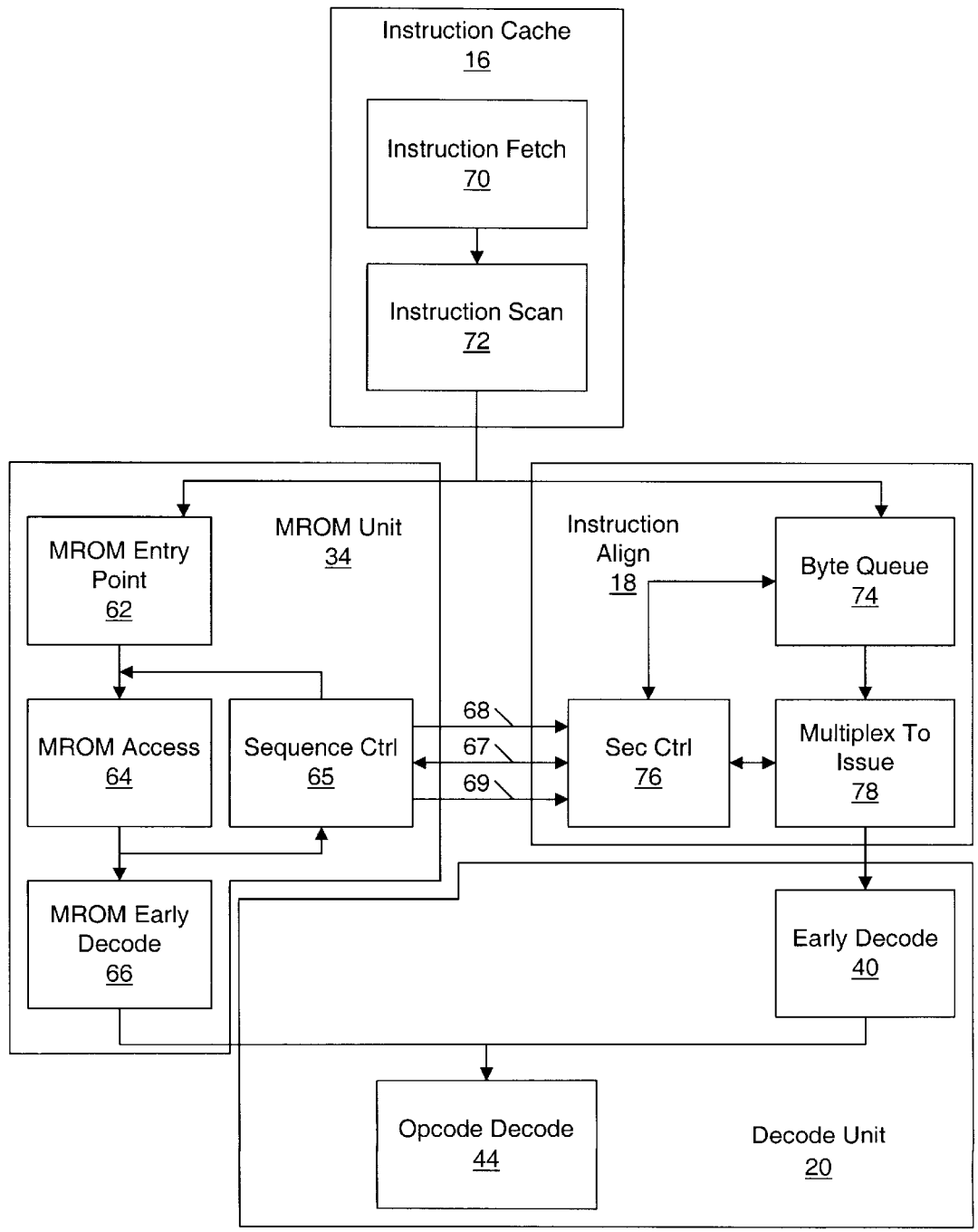
FIG. 2 is a diagram depicting a portion of an instruction processing pipeline employed by one embodiment of the microprocessor shown in FIG. 1.

Turning now to FIG. 2, a diagram depicting portions of instruction cache 16, instruction alignment unit 18, decode unit 20 and MROM unit 34 is shown. Embodiments of microprocessor 10 may employ other elements in addition to those shown in FIG. 2. Instruction cache 16 includes instruction fetch 70 and instruction scan 72. MROM unit 34 includes MROM entry point 62, MROM access 64, sequence control 65, and MROM early decode 66. Instruction alignment unit 18 includes byte queue 74, selection control unit 76, and multiplex to issue 78. Decode unit 20 includes early decode 40 and opcode decode 44.

Instruction fetch 70 fetches instructions from instruction cache storage (not shown) using addresses provided by branch prediction unit 14. Instruction fetch 70 conveys the fetched instructions to instruction scan unit 72. Instruction scan unit 72 conveys the instructions to byte queue 74, and detects MROM instructions. MROM instructions detected by instruction scan unit 72 are conveyed to MROM entry point 62. In one embodiment, one MROM instruction per clock cycle is accepted by MROM unit 34. Therefore, if a second MROM instruction is detected within a set of instruction bytes being scanned during a particular clock cycle, instruction blocks including the second MROM instruction and subsequent instructions in the program order are stalled until a subsequent clock cycle.

The flow of instructions through instruction alignment unit 18 and decode unit 20 is discussed in more detail below with reference to FIG. 6. The flow of instructions through MROM unit 34 is discussed next. MROM entry point 62 calculates the location, or microaddress, of the first microcode instruction in MROM access 64 that corresponds to an MROM instruction received from instruction scan unit 72. In one embodiment, the microaddress is calculated from the opcode, the MODR/M bytes, and the prefix byte of the MROM instruction. The microaddress calculated by MROM entry point 62 is the location of the first microcode line that stores the microcode instructions that effectuate the desired operation of the MROM instruction. Microcode instructions, like fastpath instructions, are directly decodeable by the decode unit. The number of microcode instructions required to implement an MROM instruction varies from MROM instruction to MROM instruction. Complex MROM instructions may require many microcode instructions, and relatively simple MROM instructions may be implemented by two microcode instructions. The microcode instructions that implement an MROM instruction may include branch instructions. For example, in one embodiment the microcode instructions to implement the MROM instruction MOVS are:

| | | |
|---|---|---|
| LDDF | | ;load direction flag to latch in FU |
| OR | ecx,ecx | ;test if ecx is zero |
| JZ | end_loop | ;terminate string moves if ecx is zero |

-continued

| | | | |
|---|---|---|---|
| loop: | MOVFM+ | tmp0, [esi] | ;move to tmp0 data from source and inc/dec esi |
| | MOVTM+ | [edi], tmp0 | ;move the data to destination and inc/dec edi |
| | DECXJNZ | loop | ;dec ecx and repeat until zero |
| end_loop: | EXIT | | |

MROM access 64 is a storage device capable of storing microcode instructions. In one embodiment, MROM access 64 is a read-only memory (ROM). In other embodiments, other storage devices can be used to implement MROM access 64. MROM access 64 uses the entry point microaddress generated by MROM entry point 62 to access the first microcode instruction line. In one embodiment, MROM access 64 stores multiple microcode instructions in each microcode line of MROM access 64. In one specific embodiment, each microcode line contains a number of microcode instructions equal to the number of functional units in the microprocessor. Because the number of microcode instructions required to implement an MROM instruction may exceed the number of microcode instructions in one line of MROM access 64, sequence control 65 determines the location of the next line of microcode to be accessed. The next line of microcode to execute may be the subsequent line in MROM access 64. If, however, a microcode line in MROM access 64 includes a "taken" branch instruction, sequence control unit 65 detects the branch microaddress and provides that microaddress as the next line to access from MROM access 64. MROM access 64 may contain two types of branch instructions: conditional sequence control branches and predict branches. A conditional sequence control branch is a branch instruction in which the branch condition can be resolved during decode. Predict branches are branches that cannot be resolved until the branch instruction is executed by a functional unit. Predict branches may depend on the state on the EFLAGs register. Because dispatched instructions that have not completed execution may modify the contents of this register, the branch condition cannot be resolved during decode. Therefore, a prediction is made whether the branch is "taken" or "not taken". If the branch is predicted "taken", sequence control 65 generates the microaddress of the next microcode line to access. If the branch is predicted "not taken", sequence control 65 provides the microaddress of the next microcode line as the next microcode line to access. In one embodiment, MROM unit 34 uses static branch prediction. In other words, the prediction is made during coding of the microcode and does not change. Other embodiments may use more complex branch prediction algorithms.

In addition to specifying branch addresses, sequence control 65 also detects the last line of the microcode sequence. If a line of microcode in MROM access 64 is the last line of microcode to implement an MROM instruction, sequence control 65 selects the entry point of the next MROM instruction, provided by MROM entry point 62, as the microaddress of the next line of microcode.

Each line of microcode accessed from MROM access 64 is dispatched to MROM early decode 66. MROM early decode 66 formats the instructions similar to the formatting of early decode unit 40, which will be discussed in more detail below with reference to FIG. 5. The formatted instructions are conveyed to opcode decode 44, which selects either the microcode instructions conveyed by MROM early decode 66 or fastpath instructions conveyed by early decode 40.

Fastpath instructions from instruction alignment unit 18 are stalled while MROM microcode instructions that implement an MROM instruction are issued by MROM unit 34. It is noted that a particular MROM instruction may arrive at MROM access 64 prior to being selected for dispatch from byte queue 74. The particular MROM instruction may be subsequent to a large number of fast path instructions within the byte queue and instructions are selected for dispatch in program order. MROM instructions are routed to MROM unit 34 but are not removed from the instruction blocks conveyed to instruction alignment unit 18. For these reasons, synchronization is provided between MROM access 64 and selection control unit 76. When MROM access 64 receives an entry point address from MROM entry point 62, MROM access 64 informs selection control unit 76 by asserting a signal upon synchronization bus 67. When selection control unit 76 receives a dispatched MROM instruction from byte queue 74, selection control unit 76 signals MROM access 64 via synchronization bus 67. In this manner, the MROM instruction progresses to both MROM early decode 66 and early decode 40 during the same clock cycle. Because both MROM access 64 and selection control unit 76 receive instructions in program order it is sufficient to synchronize instructions via synchronization bus 67.

As discussed above, sequence control 65 determines the microaddress of the next microcode line to access from MROM access 64. To generate the next address, each microcode line has a microcode sequence control field, or simply "sequence control field", associated with it. Generally speaking, a sequence control field is a field that contains data used to control the access of data within an MROM storage device. In one embodiment, this field contains data indicating whether the line is the last line of the microcode instruction, whether the microcode line contains a jump, call or branch, conditions for conditional microbranches, and other information necessary for sequence control of MROM access 64. At high operating frequencies, generating the next microaddress after reading a microcode line can be a time critical process that can create a delay in the execution of MROM instructions. To eliminate this delay, in one embodiment, the sequence control field for a microcode line is appended to the previous microcode line. In this manner, the sequence control field is known one cycle in advance. Therefore, the generation of the next address is done in parallel with accessing the microcode line from MROM access 64.

Sequence control 65 also detects the last microcode line in a microcode sequence that implements an MROM instruction. In one embodiment, the sequence control field appended to the microcode line prior to the last microcode line indicates that the subsequent microcode line is the last microcode line. This indication, called an early exit signal, is used by sequence control 65 to select the entry point generated by MROM entry point 62 as the microaddress from which to access a microcode line following the subsequent line. In addition to indicating that the subsequent microcode line is the last microcode line of an MROM instruction, the sequence control field may indicate how many microcode instructions are in the last microcode line. The number of microcode instructions in the last microcode line may be conveyed to selection control 76 via an early exit signal line 69. Selection control 76 can use the information from the early exit signal to pack additional fastpath instructions at the end of the microcode instruction line. In this manner, instructions are issued to each functional unit and dispatch bandwidth is not wasted.

Figure 3:
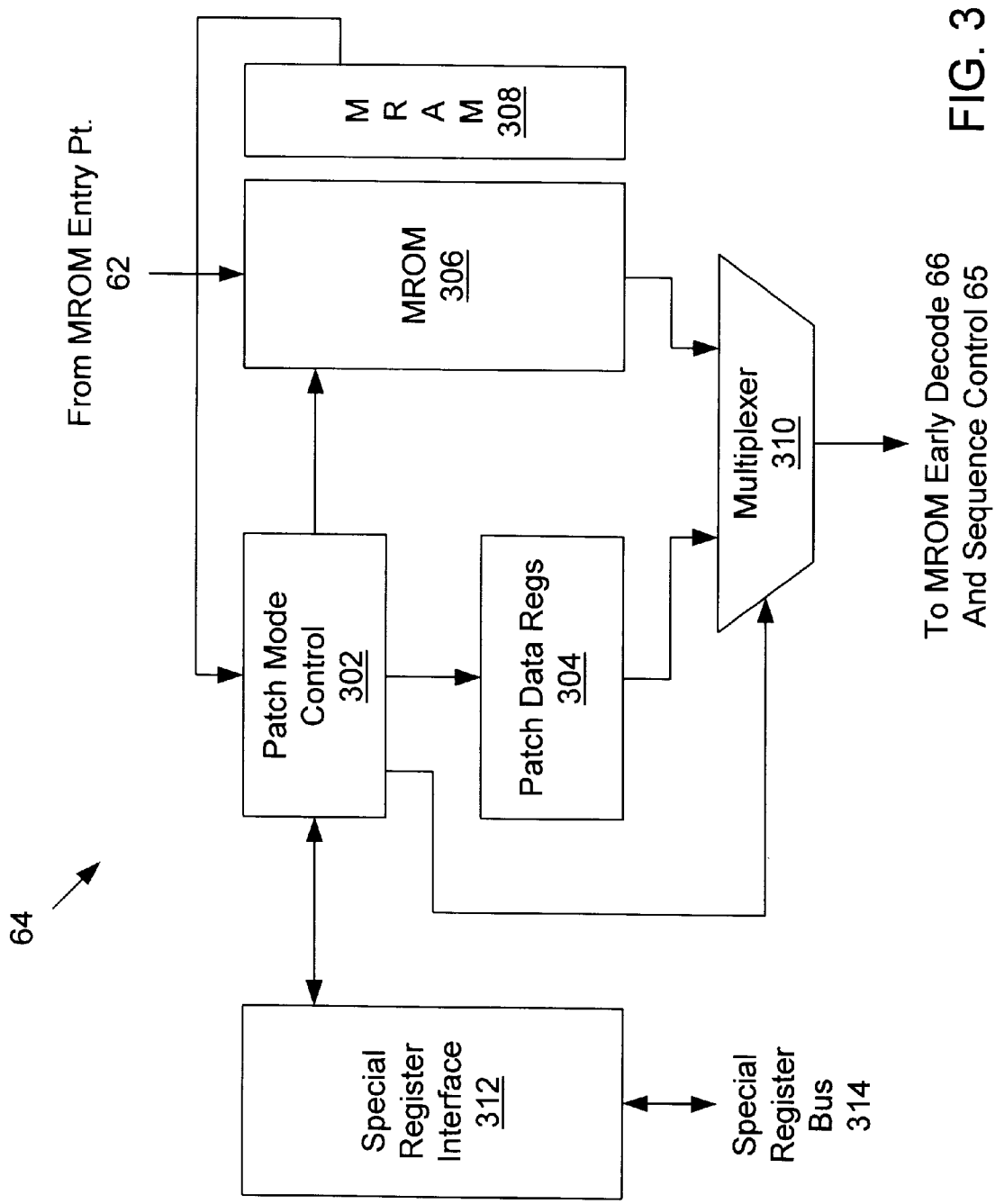
FIG. 3 is a block diagram of one embodiment of an MROM access shown in FIG. 2.

Turning now to FIG. 3, a block diagram of one embodiment of MROM access 64 is shown. A patch mode control 302 is coupled to an MROM 306, an MRAM 308, patch data registers 304, a multiplexor 310, and a special register interface 312. Patched data registers 304 are coupled to patch mode control 302 and multiplexor 310. MROM 306 is coupled to patch mode control 302, multiplexor 310, and MROM entry point 62. MRAM 308 is coupled to patch mode control 302. Multiplexor 310 is coupled to patched data registers 304 and MROM 306. Special register interface 312 is coupled to patch mode control 302 and special register bus 314.

MROM 306 uses an address generated by MROM entry point 62 to access a microcode line. Each microcode line of MROM 306 is associated with a bit, called a flag bit, of MRAM 308. In one embodiment, if the flag bit of MRAM 308 is asserted, then a microcode instruction in the microcode line associated with the flag bit should be replaced with a substitute microcode instruction stored in an external memory. This operation of replacing an existing microcode instruction with a substitute microcode instruction is called patching. In one embodiment, the flag bit of MRAM 308 is associated with a microcode line. If any microcode instruction within a microcode line should be patched, the flag bit is set and the entire line is patched. In another embodiment, a flag bit of MRAM 308 identifies a particular microcode instruction within a microcode line to be patched.

Patch mode control 302 detects the state of the flag bits stored in MRAM 308. If the flag bit associated with an accessed microcode instruction is asserted, patch mode control 302 branches to a patch microcode routine stored in MROM 306. The microcode instructions of the patch microcode routine instead of the microcode instruction identified by MROM entry point 62 are dispatched to MROM early decode 66.

The microcode instructions of the patch microcode routine cause substitute microcode instructions to be read from external memory and stored in patch data registers 304. In one embodiment, the base address of the external memory location that stores the substitute microcode instructions is stored in a special register. In one particular embodiment, the patch microcode instructions access the base address from the special register and use the line address, or entry point address, of the microcode instruction as an offset to generate the external address of the substitute microcode instruction. In other embodiments, the address is stored or generated using other conventional methods.

The patch microcode subroutine uses data transfer instructions to move the substitute microcode instruction from external memory to the patch data registers. In one embodiment, the patch data registers include three 32-bit special registers. The patch microcode routine dispatches three 32-bit reads from the external memory to the patch data registers. In one specific embodiment, the patch data registers are special registers and are accessed via special register bus 314 and special register interface 312.

In one embodiment, a control bit is used to enable/disable patching. In one particular embodiment, the control bit is in a special register that resides in patch mode control 302. If the patch mode bit is asserted, then patching is enabled and substitute microcode instructions are fetched from external memory when a flag bit in MRAM 308 is asserted. If the control bit is deasserted, patch mode is disabled, and the microcode instructions stored in MROM 306 are dispatched regardless of the state of the flag bits in MRAM 308.

A sample patch microcode routine is illustrated below:

| | |
|---|---|
| MOV tmp0, sr, [sr=patch_base, read] | ;read the patch base address |
| ADD tmp0, sr, [sr=patch_offset, read] | ;generate patch address |
| MOV sr, [tmp0], [sr=patch_data0, write] | ;read the first mcode data word |
| ADDi tmp0, 4 | ;next address |
| MOV sr, [tmp0], [sr=patch_data1, write] | ;read the next mcode data word |
| ADDi tmp0, 4 | ;next address |
| MOV sr, [tmp0], [sr=patch_data2, write] | ;read the last mcode data word |

In other embodiments, alternate patch microcode routines may be implemented.

The first instruction of the patch microcode routine reads the base address of the external memory location at which the substitute microcode instructions are stored. This base address is called a patch base address. The second instruction of the patch microcode routine generates the address of the desired substitute microcode instruction by adding the patch base address to an offset. In one embodiment, the offset is stored in a special register called a patch offset register. In one specific embodiment, the patch offset is generated from the entry point address of the MROM instruction that caused the branch to the patch microcode routine.

In one specific embodiment, the substitute microcode instruction is loaded into three patch data registers. The three patch data registers (patch_data0, patch_data1, and patch_data2) are loaded by the MOV instructions of the patch microcode routine. The ADD instructions between the move instructions increment the address from which to fetch the next portion of the substitute microcode instruction. Because the MOV instructions move 32 bits into each patch data register, the address is incremented by four between moves. After the patch microcode routine is executed, the patch data registers hold one microcode instruction and one sequence control field. Therefore, only one microcode instruction is loaded and dispatched at a time. This can be extended by adding additional patch data registers and adding more MOV instructions to the patch microcode routine. For example, an entire microcode line can be patched if 9 patch data registers are employed. It is important that the patch microcode routine does not modify the state of the microprocessor. The patch microcode routine may include instructions to store and restore the state of the microprocessor to ensure that the microprocesor state is not changed by the patch microcode routine.

In one embodiment, MROM access 64 is part of a microprocessor that implements pipeline processing. After the microcode instructions of the patch microcode routine are dispatched, it is several clock cycles before the microcode instructions are implemented by functional units 24. The microcode instructions must pass through MROM early decode 66, opcode decode 44, reservation stations 22 and functional unit 24 before to the substitute microcode instruction is stored in the patch data registers. During the time that the microcode instructions from the patch microcode routine are passing through the instruction processing pipeline, no other instructions should be dispatched. The sequence control field of the microcode instructions of the patch microcode routine are conveyed to sequence control 65 (FIG. 2) as they are dispatched from multiplexor 310. Sequence control 65 indicates to selection control 76 of instruction alignment 18 that the microcode sequence is still executing. After the microcode instructions of the patch microcode routine have been executed by functional unit 24 and the patch data registers have been loaded with the substitute microcode instruction, the substitute microcode instruction is dispatched and the sequence control field of the substitute microcode instruction is conveyed to sequence control 65. The sequence control field of the substitute microcode instruction indicates whether the substitute microcode instruction is the last microcode instruction of the microcode sequence or whether additional microcode lines should be accessed. If the sequence control field indicates that the substitute microcode instruction is the last microcode instruction, sequence control 65 indicates to sequence controller 76 that the microcode instruction sequence has ended. Otherwise, sequence control 65 generates the address of the next microcode line of MROM 306.

Figure 4:
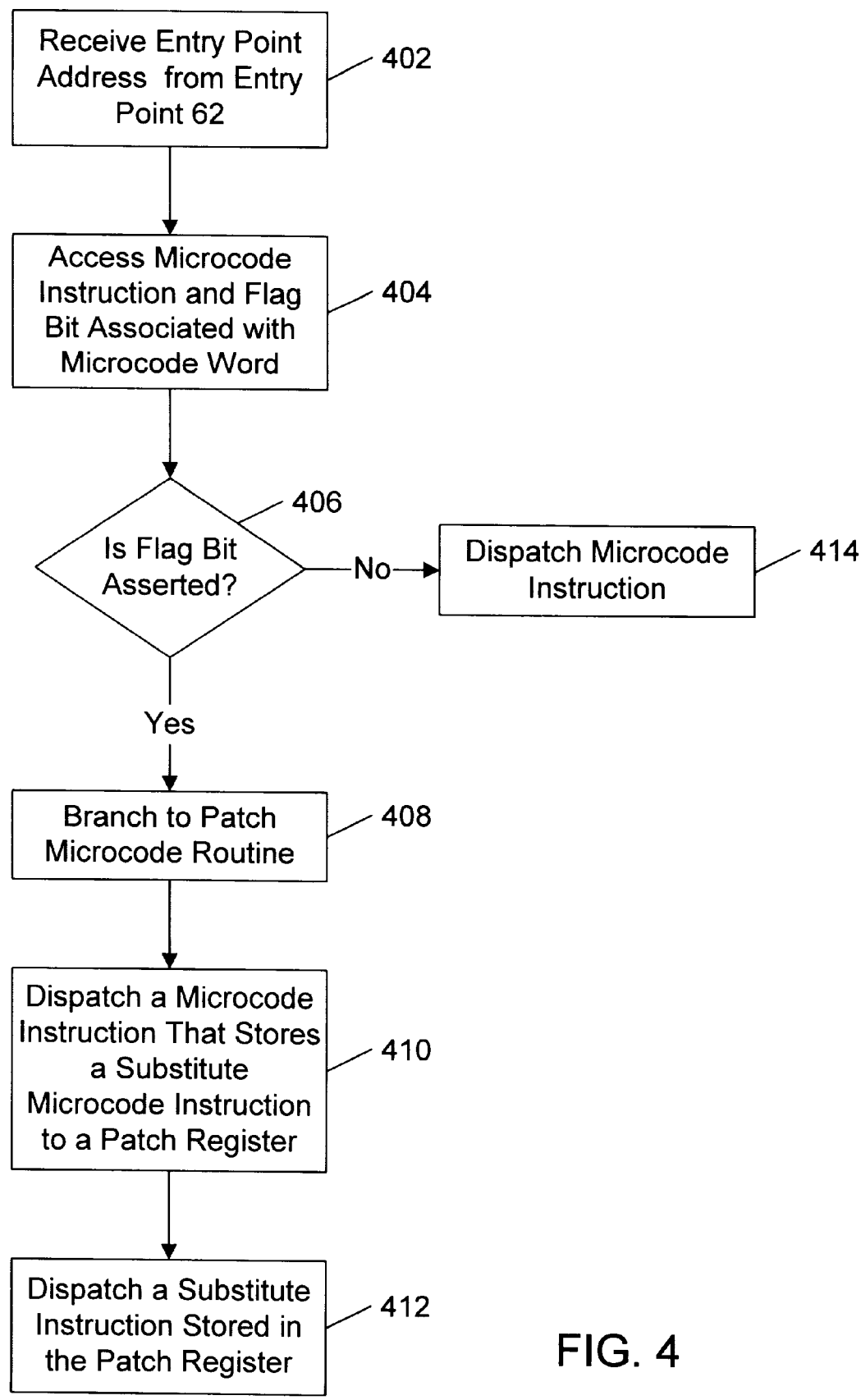
FIG. 4 is a flow chart illustrating the operation of one embodiment of the MROM access shown in FIG. 3.

Turning now to FIG. 4, a flow chart illustrating the operation of one embodiment of MROM access 64 is shown. In a step 402, MROM access 64 receives an entry point address from MROM entry point 62. In a step 404, a microcode instruction from MROM 306 and a flag bit associated with the microcode instruction is accessed. In a decisional step 406, it is determined whether the flag bit is asserted. If the flag bit is not asserted, then in a step 414 the microcode instruction is dispatched.

If in decisional step 406 the flag bit is asserted, then in a step 408, patch control 302 branches to a patch microcode routine. In a step 410, microcode instructions from the patch microcode routine are dispatched. In one embodiment, the microcode instructions from the patch microcode routine read a substitute microcode instruction from external memory and store it into one of more patch registers. In one specific embodiment, the patch microcode routine reads a special register that stores a patch base address and adds an offset to the patch base address to determine the address of the substitute microcode instruction in external memory. In a step 412, the substitute microcode instructions stored in the patch register are dispatched.

Figure 5:
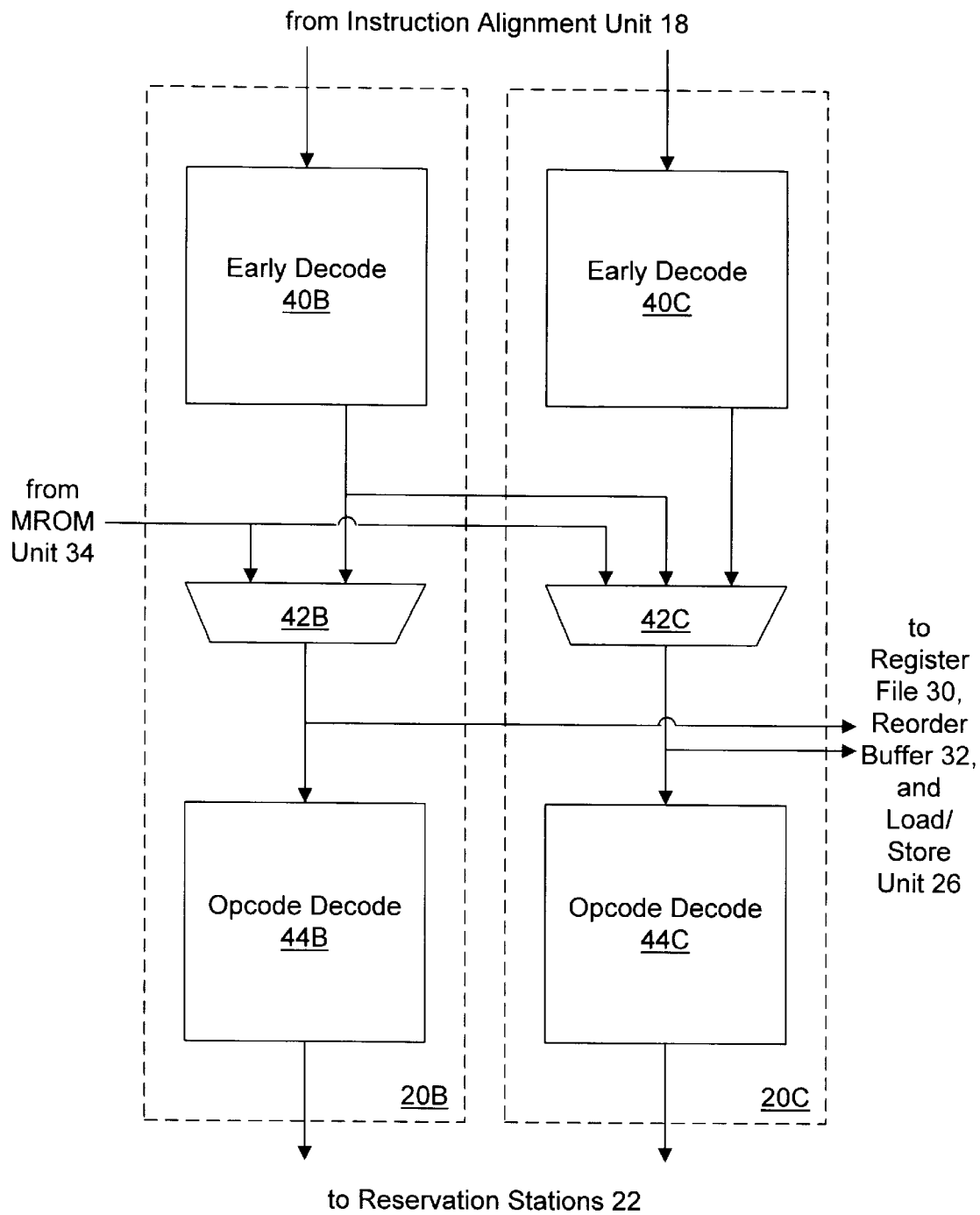
FIG. 5 is a block diagram of one embodiment of a pair of decode units shown in FIG. 1.

Turning now to FIG. 5, a block diagram of one embodiment of decode units 20B and 20C is shown. Each decode unit 20 receives an instruction from instruction alignment unit 18. Additionally, MROM unit 34 is coupled to each decode unit 20 for dispatching microcode instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Some of such instructions are classified as a special type of MROM instruction referred to as a "double dispatch" instruction. These instructions are dispatched to a pair of opcode decode units 44 by MROM unit 34. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which early decode unit 40A detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A. In this manner, instruction alignment unit 18 need not attempt to align MROM instructions and concurrently dispatched fast path instructions to their final issue positions. Instead, the instructions may be aligned to a position and then adjusted between early decode units 40 and opcode decode units 44.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

In one embodiment, MROM entry point 62 determines if a particular MROM instruction is double dispatch. A particular MROM instruction is double dispatch if the particular MROM instruction corresponds to a single line of instructions within which two instructions are stored. If MROM entry point 62 detects a double dispatch instruction, a double dispatch signal upon a double dispatch signal line 68 is asserted. Otherwise, the double dispatch signal is deasserted. The double dispatch signal is conveyed to selection control 76. Selection control 76 uses the state of the double dispatch signal to determine if instructions dispatched during the previous clock cycle should be discarded. More particularly, selection control 76 discards the second instruction in program order if: (i) an MROM instruction and a fast path instruction were concurrently dispatched; and (ii) the double dispatch signal is deasserted. Otherwise, selection control 76 passes the instructions to early decode stage 58 via multiplex to issue 78.

When byte queue 76 concurrently dispatches an MROM instruction and a fast path instruction (referred to herein as "packing"), the second of the two instructions in program order is retained in the byte queue. During each clock cycle, byte queue 74 initially selects up to four instructions for dispatch during a particular clock cycle. If byte queue 74 packed during the previous clock cycle and the double dispatch signal is asserted, then the first of the four instructions (in program order) is ignored and the remainder are dispatched. Conversely, if byte queue 74 did not pack during the previous clock cycle or the double dispatch signal is deasserted, the first three of the four instructions (in program order) are dispatched and the fourth is retained by the byte queue. In this manner, redispatch of the second of the packed instructions is performed when needed without sacrificing other dispatch positions.

Figure 6:
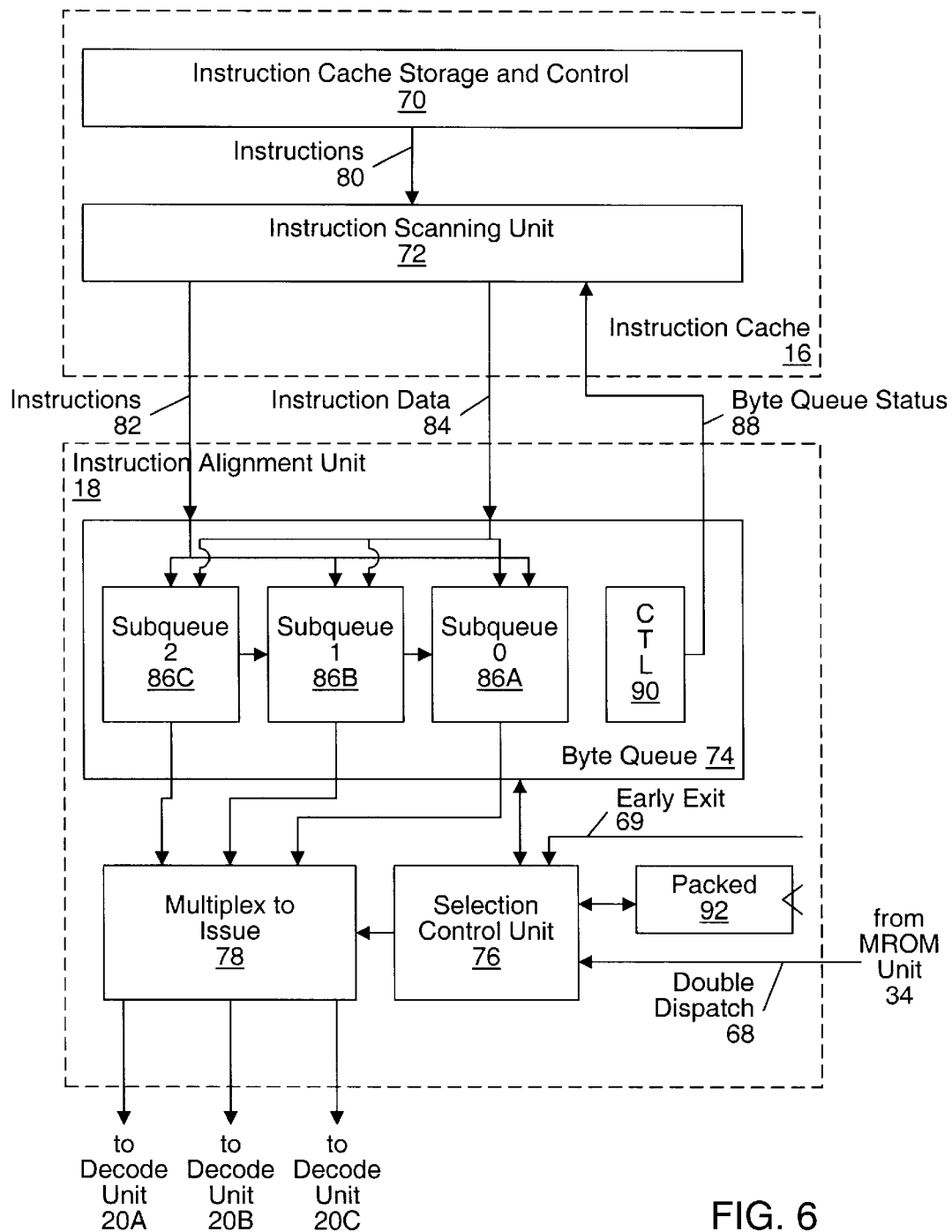
FIG. 6 is a block diagram of one embodiment of an instruction cache and instruction alignment unit shown in FIG. 1.

Turning now to FIG. 6, a block diagram of one embodiment of instruction cache 16 and instruction alignment unit 18 is shown. Instruction cache 16 includes an instruction cache storage and control block 70 and an instruction scanning unit 72. Instruction alignment unit 18 includes a byte queue 74, a selection control unit 76, and a multiplex to issue block 78.

Instruction cache storage and control block 70 includes storage for instruction cache lines and related control circuitry for accessing instructions from the storage, for selecting cache lines to discard when a cache miss is detected, etc. Instruction cache storage and control block 70 receives fetch addresses from branch prediction unit 14 (FIG. 1) in order to fetch instructions for execution by microprocessor 10. Instruction bytes fetched from instruction cache storage and control block 70 are conveyed to instruction scanning unit 72 upon an instructions bus 80. Instruction bytes are conveyed upon instructions bus 80, as well as corresponding predecode data (e.g. start, end, and functional bits). In one embodiment, sixteen bytes stored in contiguous memory locations are conveyed upon instructions bus 80 along with the corresponding predecode data. The sixteen bytes form either the upper or lower half of the 32 byte cache line. The upper half of the cache line is the half stored in memory addresses having larger numerical values, while the lower half is stored in memory addresses having smaller numerical values. Additionally, instruction scanning unit 72 receives information regarding the bytes within the sixteen bytes which are to be conveyed as instructions to instruction alignment unit 18. Instruction bytes at the beginning of the sixteen bytes may be ignored if the bytes are fetched as the target of a branch instruction, and the target address identifies a byte other than the first byte of the sixteen bytes. Additionally, if a branch instruction is within the sixteen bytes and branch prediction unit 14 predicts the branch taken, then bytes subsequent to the branch instruction within the sixteen bytes are ignored.

Instruction scanning unit 72 scans the predecode data associated with the bytes which are to be conveyed as instructions to instruction alignment unit 18. In the present embodiment, instruction scanning unit 72 divides the sixteen bytes conveyed by instruction cache storage and control block 70 into two portions comprising eight contiguous bytes each. One portion forms the lower half of the sixteen bytes (i.e. the bytes stored at smaller numerical addresses than the bytes forming the upper half of the sixteen bytes). The other portion forms the upper half of the sixteen bytes. Therefore, an eight byte portion forms one of four quarters of the 32 byte cache line employed by instruction cache storage and control block 70, according to the present embodiment. As used herein, bytes are contiguous if they are stored in contiguous memory locations in the main memory subsystem. It is noted that particular sizes of various components, such as instruction block sizes, are used herein for clarity of the description. Any size may be used for each component within the spirit and scope of the appended claims.

Instruction scanning unit 72 scans the predecode data of each portion of the instructions independently and in parallel. Instruction scanning unit 72 identifies up to a predefined maximum number of instructions within each portion from the start and end byte information included within the predecode data. For the present embodiment, the predefined maximum number is three. Generally speaking, instruction scanning unit 72 preferably identifies a maximum number of instructions in each portion equal to the number of issue positions included within microprocessor 10.

The instruction bytes and instruction identification information generated by instruction scanning unit 72 are conveyed to byte queue 74 upon an instructions bus 82 and an instruction data bus 84, respectively. The instruction bytes are conveyed as eight byte portions, and the instruction data is arranged accordingly such that each eight byte portion is associated with a portion of the instruction identification information conveyed upon instruction data bus 84. Each eight byte portion and the corresponding instruction identification information forms an instruction block. It is noted that, although an instruction block includes eight bytes in the present embodiment, instruction blocks may include any number of bytes in various embodiments. Byte queue 74 receives the instruction blocks conveyed and stores them into one of multiple subqueues included therein. In the embodiment shown, byte queue 74 includes three subqueues: a first subqueue 86A, a second subqueue 86B, and a third subqueue 86C. First subqueue 86A stores the instruction block which is foremost among the instruction blocks stored in byte queue 74 in program order. Second subqueue 86B stores the instruction block which is second in program order, and third subqueue stores the instruction block which is third in program order. It is noted that various embodiments of byte queue 74 may include any number of subqueues 66.

If a particular portion as scanned by instruction scanning unit 72 includes more than the maximum predefined number of instructions, then the particular portion is retained by instruction scanning unit 72. During the following clock cycle, the particular eight byte portion is scanned again. The predecode data corresponding to the previously identified instructions is invalidated such that instruction scanning unit 72 detects the additional instructions. If the other portion concurrently received with the particular portion is subsequent to the particular portion in program order, then the other portion is rescanned as well. Byte queue 74 discards the instruction blocks received from the other portion, in order to retain program order among the instruction blocks stored in the byte queue.

A control unit 90 within byte queue 74 conveys a byte queue status upon byte queue status bus 88 to instruction scanning unit 72. Byte queue status bus 88 includes a signal corresponding to each subqueue 86. The signal is asserted if the subqueue 86 is storing an instruction block, and deasserted if the subqueue 86 is not storing an instruction block. In this manner, instruction scanning unit 72 may determine how many instruction blocks are accepted by byte queue 74 during a clock cycle. If two instruction blocks are conveyed during a clock cycle and only one instruction block is accepted, instruction scanning unit 72 retains the rejected instruction block and rescans the instruction block in the subsequent clock cycle.

As noted above, an instruction block may contain up to a predefined maximum number of instructions (e.g. three in the present embodiment). Additionally, eight contiguous bytes are conveyed for each instruction block in the present embodiment. However, due to the variable byte length of the x86 instructions, an instruction may begin within one set of contiguous bytes and end in another set of contiguous bytes, referred to as overflow instructions. If an overflow instruction is detected, it is identified as the last of the predefined number of instructions. Instead of being indicated as a valid instruction within the instruction block, the overflow instruction is identified as an overflow. Instruction identification information is generated, but the instruction is handled somewhat differently, as will be explained in more detail below.

In one embodiment, the instruction identification information for each instruction includes: (i) start and end pointers identifying the bytes at which the identified instruction begins and ends within the eight bytes; (ii) a valid mask containing eight bits, one for each of the eight bytes; (iii) a bit indicative of whether the instruction is NROM or fast path; and (iv) an instruction valid bit indicating that the instruction is valid and an overflow bit for the last instruction indicating that it is an overflow. The valid mask includes a binary one bit corresponding to each byte included within the particular instruction (i.e. the bits between the start pointer and end pointer, inclusive, are set). Zero bits are included for the other bytes. Additional information conveyed with the instruction identification information is the taken/not taken prediction if the instruction is a branch instruction, bits indicating which of the quarters of the 32 byte cache line the eight bytes correspond to, the functional bits from the predecode data corresponding to the eight bytes, and a segment limit identifying the segment limit within the eight bytes for exception handling. The additional information is provided by instruction cache storage and control block 70 except for the branch prediction, which is provided by branch prediction unit 14.

Selection control unit 76 examines the instruction identification information stored in each subqueue to generate selection controls for multiplex to issue block 78. Multiplex to issue block 78 includes a plurality of multiplexors for selecting instruction bytes from byte queue 74 for conveyance to each of decode units 20. Byte queue 74 maintains certain properties with respect to each subqueue 86 in order to simplify the selection logic within selection control unit 76, as will be explained in more detail below. Instructions are selected and conveyed, and corresponding instruction identification information is invalidated such that subsequent instructions may be dispatched in subsequent clock cycles.

Subqueues 86 store instruction information in a plurality of instruction positions (or simply "positions"). The number of instruction positions is preferably equal to the maximum number of instructions which may be included in an instruction block. For the present embodiment, three positions are included. The first position ("position I0") stores the instruction identification information corresponding to the instruction which is foremost in program order within the instruction block stored in the subqueue 86. The second position ("position I1") stores the instruction identification information corresponding to the second instruction in program order within the instruction block. Finally, the third position ("position I2") stores the instruction identification information corresponding to the last instruction in program order. Alternatively, position I2 may store instruction identification information corresponding to an overflow instruction. Certain instruction identification information is the same for each instruction (e.g. the segment limit). To avoid duplicating information, this instruction information may be stored as a single copy separate from the instructions positions.

Control unit 90 maintains the information stored in each subqueue 86. In particular, control unit 90 directs each subqueue 86 to shift instruction identification information between the positions when instructions are selected for dispatch. For example, if the instruction corresponding to position I0 is dispatched, the information stored in position I1 is shifted into position I0 and the information stored in position I2 is shifted into position I1. Similarly, if the instructions corresponding to positions I0 and I1 are dispatched, then information stored in position I2 is shifted into position I0. In this manner, the instruction within the subqueue which is foremost in program order is maintained in position I0, the instruction which is second in program order is maintained in position I1, etc. In order to select an instruction for dispatch to decode unit 20A, selection control unit 76 examines the instruction identification information stored in position I0 of each subqueue. Advantageously, a small amount of logic may be employed to select the instruction. Similarly, position I0 of subqueue 86A and position I2 of each subqueue 86A–86C are not examined to select an instruction for decode unit 20B. The second instruction to be dispatched will be found within the first two positions of one of the subqueues 66 when maintained in accordance with the above. Selection control unit 76 informs control unit 90 of which instructions positions were selected for dispatch during a clock cycle, such that subqueue shifting may be performed.

According to one embodiment, instruction identification information is shifted internally to each subqueue 86 independently. Instruction identification information is not, therefore, shifted from position I0 of subqueue 86B into positions within subqueue 86A. Instead, when each of the instructions within subqueue 86A have been dispatched, subqueue 86B is shifted into subqueue 86A as a whole. The logic for shifting between subqueues 86 may operate independently from and in parallel with the internal shifting of each subqueue 86A–86C.

Position I2 may store instruction identification information regarding an overflow instruction. If position I2 is storing information regarding an overflow instruction, then the information is not shifted to position I0 or I1 as described above. In this manner, overflow instruction information is always available in position I2. Selection control unit 76 may examine the information stored in position I2 for routing bytes corresponding to an overflow instruction, as opposed to having to locate the overflow information within the positions and then determining byte routing.

Selection control unit 76 selects instructions from the instruction positions within subqueues 86 for potential dispatch. The instructions selected are the instructions which are foremost in program order among the instructions stored in subqueues 86. The operation of select control unit 76 with respect to double dispatch instructions is discussed next.

In one embodiment, more instructions are initially selected for dispatch than the number of issue positions included in microprocessor 10, in order to correctly perform redispatch of instructions when an MROM instruction and a fast path instruction are concurrently dispatched and the MROM instruction is found to be an arbitrary dispatch instruction. Selection control unit 76 then selects from the potentially dispatchable instructions based upon the value of a packed state stored in a packed state register 92 coupled to selection control unit 76 and the state of the double dispatch signal upon double dispatch conductor 68, also coupled to selection control unit 76.

When selection control unit 76 selects an MROM instruction and a fast path instruction for concurrent dispatch during a clock cycle, selection control unit 76 sets the packed state. Otherwise, the packed state is reset. The packed state so generated is stored into packed state register 92 for use during the succeeding clock cycle. Additionally, selection control unit 76 informs control unit 90 that the first of the MROM instruction and the fast path instruction (in program order) is being dispatched. In this manner, byte queue 54 retains the second of the two instructions in program order, despite the dispatch of the second of the two instructions. In one embodiment, the packed state comprises a bit indicative, when set, that an MROM instruction and a fast path instruction were concurrently dispatched in the previous clock cycle.

From the potentially dispatchable instructions, selection control unit 76 selects instructions for dispatch based upon the packed state stored in packed state register 92 and the double dispatch signal. If the packed state is set, an MROM instruction and a fast path instruction were concurrently dispatched in the previous clock cycle. Therefore, the instruction within the potentially dispatchable instructions which is foremost in program order is one of the two instructions previously dispatched when the packed state is set. If the packed state is set and the double dispatch signal is asserted, the concurrent dispatch of the MROM instruction and the fast path instruction is successful If the packed state is set and the double dispatch signal is deasserted, the concurrent dispatch of the MROM instruction and the fast path instruction is unsuccessful. The MROM instruction occupies at least three issue positions, and therefore the fast path instruction cannot be concurrently dispatched for the embodiment of microprocessor 10 shown in FIG. 1. If the packed state is clear, concurrent dispatch of an MROM and fast path instructions was not performed in the previous clock cycle. Therefore, the instructions within the potentially dispatchable instructions were not previously dispatched.

According to one embodiment, selection control unit 76 selects the foremost instructions in program order from the set of potentially dispatchable instructions if either the packed state is clear or the packed state is set and the double dispatch signal is deasserted. In the case of the packed state being clear, the foremost set of instructions are dispatched and program order is maintained. In the case of the packed state being set and the double dispatch signal being deasserted, the second of the instructions dispatched during the previous clock cycle is redispatched. If the second of the instructions is the MROM instruction, it is dispatched alone. If the second of the instructions is the fast path instruction, additional instructions may be selected for concurrent dispatch. Advantageously, the largest number of concurrently dispatchable instructions is selected, even in the case of redispatching a previously dispatched instruction.

If the packed state is set and the double dispatch signal is asserted, then the instruction within the potentially dispatched instructions which is foremost in program order is the second of the previously dispatched instructions and that instruction is successfully dispatched during the previous clock cycle (i.e. the MROM instruction and fast path instruction, when taken together, occupy a number of issue positions less than or equal to the number of issue positions included within microprocessor 10). This instruction is therefore not selected during the current clock cycle. Instead, instructions are dispatched from the remaining of the potentially dispatchable instructions.

Upon selection of the instructions dispatched, the packed state is determined for the subsequent clock cycle. In addition, control unit 90 is informed of the instructions dispatched. For the case of the packed state being set and the double dispatch signal being asserted, the instruction which was previously dispatched is indicated as dispatched as well as each of the instructions dispatched during the present clock cycle. Subqueues 86 are shifted accordingly. In one embodiment, control unit 90 is informed of the subqueue and position storing the last instruction (in program order) to be dispatched. Selection control unit 76 identifies the last instruction in accordance with the above functionality. Byte queue 74 shifts out the instructions prior to and including the indicated last instruction. In this manner, byte queue 74 operates independent of the logic used to concurrently dispatch MROM and fast path instructions. For example, when packing an MROM instruction and a fast path instruction, the first of the instructions in program order is marked as the last instruction. The second of the instructions is thereby retained in byte queue 74 while the first of the instructions is shifted out.

The operation of selection control unit 76 with respect to the early exit signal from MROM unit 34 is discussed next for one embodiment of microprocessor 10. Selection control unit 76 receives the early exit signal from sequence control 65 (FIG. 2) via early exit signal line 69. The early exit signal indicates whether the next microcode line issued by MROM access 64 is the last microcode line in a microcode sequence that implements an MROM instruction and the number of microcode instructions in the last microcode line. If the number of microcode instructions is less than the number of issue positions, selection control 76 may pack fastpath instructions after the microcode instructions. For example, in the embodiment illustrated in FIG. 1, three issue positions are available. If the last microcode line of an MROM instruction microcode sequence contains only two microcode instructions, selection control unit 76 may pack one fastpath instruction after the microcode line. Likewise, if the pack signal indicates that the last microcode line contains one microcode instruction, selection control unit 76 may pack two fastpath instructions after the microcode line. By packing fastpath instructions at the end of microcode lines, each issue position is utilized.

Selection control unit 76 packs the fastpath instructions following the microcode instructions. Because the fastpath instructions are later in program order than the MROM instruction, the fastpath instructions are packed subsequent to the microcode instructions. For example, if the last microcode line includes two microcode instructions, the two microcode instructions are dispatched to decode unit 20A and decode unit 20B. The fastpath instruction foremost in program order is dispatched to decode unit 20C. In addition, control unit 90 is informed of the number of fastpath instructions dispatched, and subqueues 86 are shifted accordingly. The packed fastpath instructions are dispatched from byte queue 74 to the proper issue position by multiplex to issue 78.

It is noted that additional details regarding the operation of byte queue 74 may be found in the commonly assigned, co-pending patent application entitled: "A Byte Queue Divided into Multiple Subqueues for Optimizing Instruction Selection Logic", filed May 17, 1996 by Narayan, et al., now U.S. Pat. No. 5,748,978. The disclosure of the referenced patent application is incorporated herein by reference in its entirety. It is further noted that additional details regarding the operation of double-dispatch instructions and the sequence control unit may be found in the commonly assigned, co-pending application entitled: "A Method For Concurrently Dispatching Microcode And Directly-Decoded Instructions In A Microprocessor", filed on Jul. 24, 1996 by Narayan et al., Ser. No. 08/685,656, now abandoned in favor of file wrapper continuation Ser. No. 08/878,228. The disclosure of the referenced patent application is incorporated herein by reference in its entirety.

Figure 7:
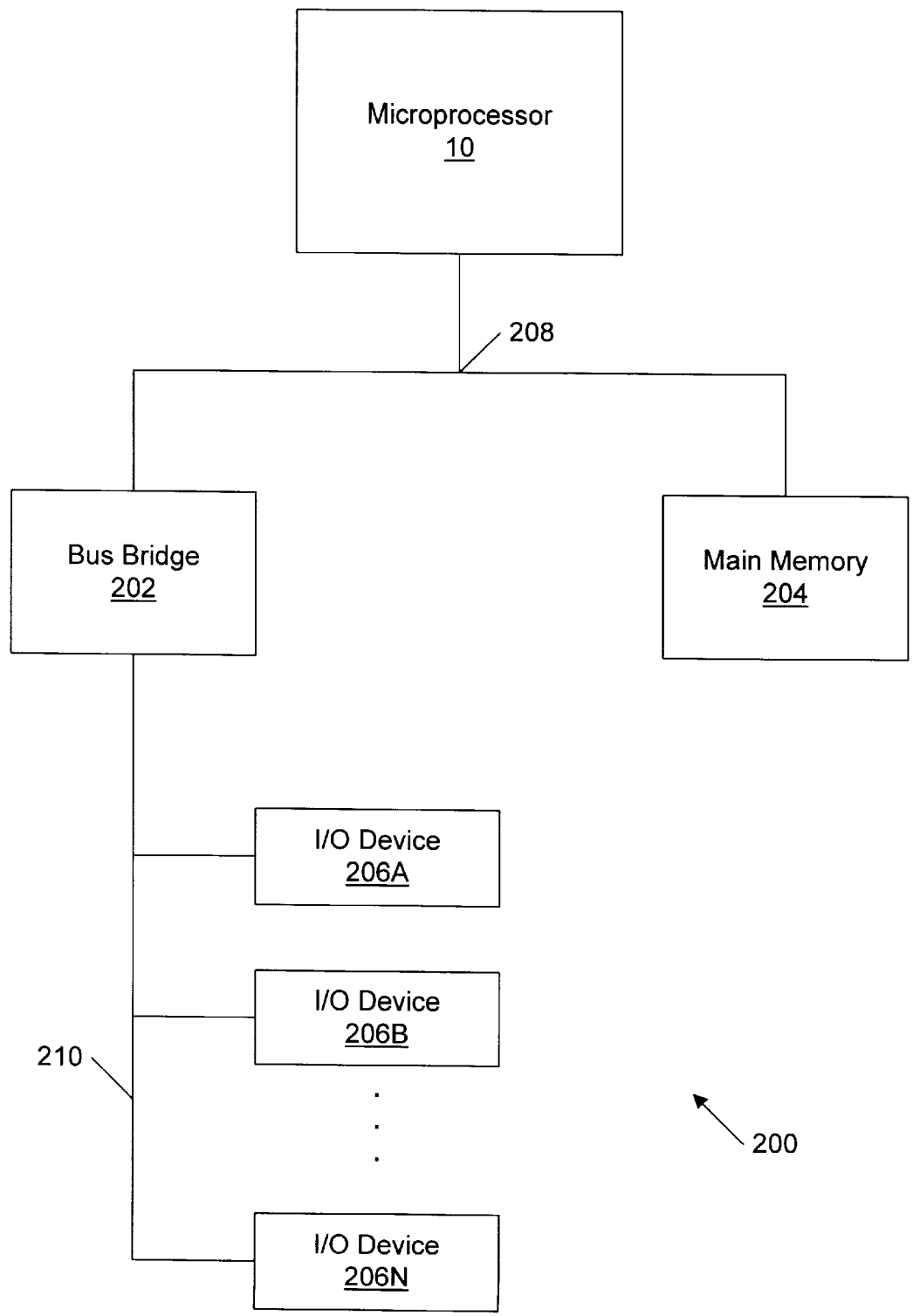
FIG. 7 is a block diagram of a computer system including the microprocessor shown in FIG. 1.

Turning now to FIG. 7, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, us bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 9 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

Although the x86 microprocessor architecture and instruction set have been used as a specific example herein, it is noted that the apparatus and method described herein may be applicable to any microprocessor which employs microcode and directly-decoded instructions. Such embodiments are contemplated.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |

TABLE 1-continued x86 Fast Path, Double Dispatch, and MROM Instructions

| X86 Instruction | Instruction Category |
|---|---|
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |

TABLE 1-continued x86 Fast Path, Double Dispatch, and MROM Instructions

| X86 Instruction | Instruction Category |
| --- | --- |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt; "Superscalar Microprocessor Including a High Performance Instruction Alignment Unit", Ser. No. 08/377,843, filed Jan. 25, 1995 by Witt, et al; "A Way Prediction Structure", Ser. No. 08/522,181, filed Aug. 31, 1995 by Roberts, et al; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473, filed Jan. 2, 1996 by Narayan, et al. The disclosure of these patent applications are incorporated herein by reference in their entirety.

Numerous variations and modifications will become apparent to those skilled in the art once the above disclosure is fully appreciated. It is intended that the following claims be interpreted to embrace all such variations and modifications.

What is claimed is:

1. A microcode patching device coupled to receive a first fetched instruction fetched by a microprocessor including said microcode patching device, the microcode patching device comprising:

a first memory for storing microcode instructions, wherein said first memory stores a patch microcode routine;

a second memory for storing a plurality of flag bits, wherein different ones of said plurality of flag bits are associated with different ones of said microcode instructions;

an address generator coupled to said first memory, wherein said address generator generates, in response to said first fetched instruction, an entry point address of a first microcode instruction within said first memory, said first microcode instruction corresponding to said first fetched instruction, wherein said first memory is configured to provide said first microcode instruction in response to said entry point address, and wherein said second memory is configured to provide a first flag bit of said plurality of flag bits in response to said entry point address; and a controller coupled to said first memory and said second memory, wherein if said first flag bit associated with said first microcode instruction is asserted, said controller: branches to said patch microcode routine; dispatches a second microcode instruction within said patch microcode routine that stores a substitute microcode instruction corresponding to said first fetched instruction in a data register; and dispatches said substitute microcode instruction instead of said first microcode instruction.

2. The microcode patching device of claim 1 wherein said substitute microcode instruction is accessed from an external memory.

3. The microcode patching device of claim 2 wherein said controller dispatches microcode instructions of said patch microcode routine that: read a base address; generate a patch address by adding an offset based on said entry point address to said base address, and access said substitute microcode instruction using said patch address.

4. The microcode patching device of claim 1 wherein said controller includes a multiplexer coupled to said first memory and said data register, wherein said controller selects between microcode instructions from said first memory and said substitute microcode instruction.

5. The microcode patching device of claim 1 wherein said first memory is a read-only memory and said second memory is a random access memory.

6. The microcode patching device as recited in claim 1 further comprising an instruction cache and an instruction queue coupled to said instruction cache, wherein said instruction queue is separate from said data register, and wherein instructions fetched from said instruction cache are stored into said instruction queue.

7. A method of patching microcode instructions comprising:

receiving an entry point address generated in response to a first fetched instruction;

accessing a microcode instruction corresponding to said first fetched instruction using said entry point address;

accessing a flag bit associated with said microcode instruction using said entry point address;

if said flag bit is deasserted, dispatching said microcode instruction; and if said flag bit is asserted, branching to a patch microcode routine, dispatching microcode instructions within said patch microcode routine that store a substitute microcode instruction corresponding to said first fetched instruction in a data register, and dispatching said substitute microcode instruction instead of said microcode instruction.

8. The method of patching microcode instructions of claim 7 wherein said substitute microcode instruction is accessed from an external memory.

9. The method of patching microcode instructions of claim 7 further comprising the step of halting the dispatch of instructions between dispatching said microcode instruction that stores said substitute microcode instruction in said patch register and dispatching said substitute microcode instruction.

10. The method of patching microcode instructions of claim 7 wherein said patch microcode routine further dispatches microcode instructions that: read a base address; calculate a patch address by adding an offset to said base address, wherein said offset is based on said entry point address; and access said substitute microcode instruction using said patch address.

11. The method of patching microcode instructions of claim 7 wherein said microcode instruction is accessed from a read-only memory and said flag bit is accessed from a random access memory.

12. The method of patching microcode instructions of claim 11 further comprising the step of selecting either a microcode instruction from said read-only memory or said substitute microcode instruction from said patch register.

13. The method as recited in claim 7 further comprising:
fetching instructions into an instruction queue separate from said data register; and
dispatching said instruction from said instruction queue.

14. A microprocessor comprising:
an instruction cache;
a first instruction unit coupled to said instruction cache;
a microcode instruction unit coupled to said instruction cache to receive a first fetched instruction fetched from said instruction cache, said microcode instruction unit including:
 a first memory for storing microcode instructions, wherein said first memory stores a patch microcode routine;
 a second memory for storing a plurality of flag bits, wherein different ones of said plurality of flag bits are associated with different ones of said microcode instructions;
 an address generator coupled to said first memory, wherein said address generator generates, in response to said first fetched instruction, an entry point address of a first microcode instruction within said first memory, said first microcode instruction corresponding to said first fetched instruction, wherein said first memory is configured to provide said first microcode instruction in response to said entry point address, and wherein said second memory is configured to provide a first flag bit of said plurality of flag bits in response to said entry point address; and
 a controller coupled to said first memory and said second memory, wherein if said first flag bit associated with said first microcode instruction is asserted, said controller: branches to said patch microcode routine; dispatches a second microcode instruction within said patch microcode routine that stores a substitute microcode instruction corresponding to said first fetched instruction in a data register; and dispatches said substitute microcode instruction instead of said first microcode instruction;
a decode unit coupled to said first instruction unit and said microcode instruction unit; and
one or more functional units coupled to said decode unit.

15. The microprocessor of claim 14 wherein said substitute microcode instruction is accessed from an external memory.

16. The microprocessor of claim 15 wherein said controller dispatches microcode instructions of said patch microcode routine that: read a base address; generate a patch address by adding an offset based on said entry point address to said base address, and access said substitute microcode instruction using said patch address.

17. The microprocessor of claim 14 wherein said controller includes a multiplexer coupled to said first memory and said data register, wherein said controller selects between microcode instructions from said first memory and said substitute microcode instruction.

18. The microprocessor of claim 14 wherein said first memory is a read-only memory and said second memory is a random access memory.

19. The microprocessor as recited in claim 14 wherein said first instruction unit includes an instruction queue, and wherein said first instruction unit is configured to store instructions fetched from said instruction cache into said first instruction queue and to dispatch said instructions to said decode unit.

20. A computer system comprising:
a microprocessor including:
 an instruction cache; and
 a microcode instruction unit coupled to said instruction cache to receive a first fetched instruction fetched from said instruction cache, said microcode instruction unit including:
  a first memory for storing microcode instructions, wherein said first memory stores a patch microcode routine;
  a second memory for storing a plurality of flag bits, wherein different ones of said plurality of flag bits are associated with different ones of said microcode instructions;
  an address generator coupled to said first memory, wherein said address generator generates, in response to said first fetched instruction, an entry point address of a first microcode instruction within said first memory, said first microcode instruction corresponding to said first fetched instruction, wherein said first memory is configured to provide said first microcode instruction in response to said entry point address, and wherein said second memory is configured to provide a first flag bit of said plurality of flag bits in response to said entry point address; and
  a controller coupled to said first memory and said second memory, wherein if said first flag bit associated with said first microcode instruction is asserted, said controller: branches to said patch microcode routine; dispatches a second microcode instruction within said patch microcode routine that stores a substitute microcode instruction corresponding to said first fetched instruction in a data register; and dispatches said substitute microcode instruction instead of said first microcode instruction; and an input/output (I/O) device coupled to said microprocessor and to another computer system, wherein said I/O device is configured to communicate between said computer system and said another computer system.

21. The computer system as recited in claim 20 wherein said I/O device comprises a modem.

22. The computer system as recited in claim 20 wherein said first instruction unit includes an instruction queue, and wherein said first instruction unit is configured to store instructions fetched from said instruction cache into said first instruction queue and to dispatch said instructions to said decode unit.

* * * * *